(12) United States Patent
Sagardoyburu

(10) Patent No.: US 11,774,802 B2
(45) Date of Patent: Oct. 3, 2023

(54) ENHANCED REFLECTIVE LCD

(71) Applicant: The Swatch Group Research and Development Ltd, Marin (CH)

(72) Inventor: Michel Sagardoyburu, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 17/326,584

(22) Filed: May 21, 2021

(65) Prior Publication Data

US 2022/0146885 A1    May 12, 2022

(30) Foreign Application Priority Data

Nov. 6, 2020 (EP) .................................... 20206240

(51) Int. Cl.
| G02F 1/13357 | (2006.01) |
| G02F 1/1335 | (2006.01) |
| G02F 1/137 | (2006.01) |
| G04G 9/00 | (2006.01) |

(52) U.S. Cl.
CPC ........ *G02F 1/133617* (2013.01); *G02F 1/137* (2013.01); *G02F 1/133514* (2013.01); *G02F 1/133528* (2013.01); *G02F 1/133553* (2013.01); *G04G 9/0017* (2013.01); *G02F 2203/02* (2013.01)

(58) Field of Classification Search
CPC ................................................. G02F 1/133617
See application file for complete search history.

(56) References Cited

U.S. PATENT DOCUMENTS

| 10,732,460 | B1* | 8/2020 | Chen .................. G02F 1/133621 |
| 2013/0201429 | A1* | 8/2013 | Xu .......................... G02F 1/1368 349/95 |
| 2016/0154275 | A1 | 6/2016 | Saneto et al. |
| 2016/0223863 | A1* | 8/2016 | Mizunuma ........ G02F 1/133617 |
| 2017/0255042 | A1 | 9/2017 | Cheng |
| 2018/0011447 | A1* | 1/2018 | Yoshizumi .............. G06F 3/041 |

FOREIGN PATENT DOCUMENTS

| JP | 11-72786 A | 3/1999 |
| JP | 2000-2876 A | 1/2000 |
| JP | 2004-287324 A | 10/2004 |
| JP | 2016-142845 A | 8/2016 |
| JP | 2020-109425 A | 7/2020 |
| WO | 2018/198735 A1 | 11/2018 |
| WO | 2018/230393 A1 | 12/2018 |

OTHER PUBLICATIONS

European Search Report for 20 20 6240 dated Feb. 28, 2021.

\* cited by examiner

*Primary Examiner* — Edmond C Lau
(74) *Attorney, Agent, or Firm* — Sughrue Mion, PLLC

(57) ABSTRACT

The present invention concerns a watch (200) or a smart watch (200) having a low power consuming and a bright and enhanced low energy display (100) by using a low energy display (100) configured to display at least one piece of information and to convert at least one primary light (410) into at least one second light (420).

8 Claims, 2 Drawing Sheets

ENHANCED REFLECTIVE LCD

CROSS-REFERENCE TO RELATED APPLICATIONS

This application claims priority to European Patent Application No. 20206240.2 filed Nov. 6, 2020, the entire contents of which are incorporated herein by reference.

TECHNICAL FIELD

The present invention relates to the field of liquid crystal display and in particular of an enhanced reflective liquid crystal display. More specifically, this invention deals with a low energy display.

STATE OF THE ART

Liquid crystal display, LCD hereafter, are widely used in watches since it has good contrast and a low energy consumption. However, the LCD's reflectivity lacks esthetics quality for some products, and, for example, red monochrome display are often too dark.

SUMMARY OF THE INVENTION

The present invention relates to a low energy display for a watch or a smart watch, preferably of a watch or a smart watch, configured to display at least one piece of information and to receive at least one primary light; said low energy display comprising at least one:
  Wavelength conversion member: said at least one wavelength conversion member is configured to convert totally or partially said at least one primary light, by absorbing totally or partially said at least one primary light, into at least one secondary light, by emitting said at least one secondary light;
  Optical switch: said at least one optical switch is configured to block or transmit totally or partially said at least one primary light and/or said at least one secondary light; and,
  Reflecting element: said at least reflecting element configured to reflect and/or to diffuse totally or partially said at least one secondary light and primary light.

Thanks to this configuration, said low energy display converts said at least one primary light into at least one secondary light.

According to an embodiment, said at least one wavelength conversion member is made of at least one quantum dot, a phosphorescent material or a fluorescent material and/or of at least one quantum rod.

Thanks to this configuration, said quantum dot and/or quantum rod converts said at least one primary light into at least one secondary light.

According to an embodiment, said at least one quantum rod is configured to be aligned relative to the polarization sensitive optical switch.

Thanks to this configuration, the transmittance of said at least one secondary light emitted by said at least one quantum rod is maximized.

According to an embodiment, said at least one display optical switch comprises a liquid-crystal display, or thin-film transistor liquid-crystal display.

Thanks to this configuration, said low energy display displays at least one piece of information.

According to an embodiment, said at least one reflecting element comprises a reflector, preferably a metallic reflector and/or a dielectric reflector or a reflective polarizer preferably a multi-interference-layers and/or a wiregrid type.

Thanks to this configuration, said low energy display can reflect or diffuse said at least one primary light and/or said at least one secondary light.

According to an embodiment, said at least one primary light comprising at least one first primary wavelength, at least one second primary wavelength, at least one first primary polarization and/or at least one second primary polarization, and/or wherein said at least one secondary light comprising at least one first secondary wavelength, at least one second secondary wavelength, at least one first secondary polarization and/or at least one second secondary polarization.

According to an embodiment, said low energy display comprises at least one first optical filter; said at least one first optical filter comprises at least one first color filter configured to transmit said at least one first primary wavelength, said at least one first secondary wavelength, and/or said at least one second secondary wavelength and/or preferably to block said at least one second primary wavelength.

According to an embodiment, said at least one first optical filter comprises at least one first polarizer configured to transmit totally or partially said at least one first primary polarization, said at least one first secondary polarization and/or said at least one second secondary polarization and/or preferably to block said at least one second primary polarization.

According to an embodiment, wherein said at least one optical switch comprises said at least one first optical filter and/or said at least one second optical filter; said at least one first optical filter and/or said at least one second optical filter comprises or comprise dichroic dies.

Thanks to one of those configurations, said at least one first optical filter transmits totally or partially said at least one primary light and/or said at least one secondary light or preferably blocks partially said at least one primary light.

According to an embodiment, said low energy display comprises at least one second optical filter; said at least one second optical filter comprises at least one second color filter configured to transmit totally or partially said at least one first primary wavelength, said at least one first secondary wavelength, and/or said at least one second secondary wavelength.

According to an embodiment, said at least one second optical filter comprising at least one second polarizer configured to transmit totally or partially said at least one first primary polarization, said at least one first secondary polarization and/or said at least one second secondary polarization.

Thanks to one of those configurations, said at least one second optical filter transmits totally or partially said at least one primary light and/or said at least one secondary light or preferably blocks partially said at least one primary light.

According to an embodiment, said at least one display is between said at least one first optical filter, said at least one second optical filter and/or said at least one wavelength conversion member.

Thanks to this configuration, said at least one display blocks or transmits said at least one secondary light.

According to an embodiment, said at least one primary light comprising at least one primary wavelength range of 380 nm to 565 nm and/or wherein said at least one secondary light comprising at least one secondary wavelength range of 485 nm to 740 nm.

Thanks to this configuration, said low energy display converts said at least one primary light, by absorbing said primary wavelength range, into at least one secondary light having at least one secondary wavelength range.

The present invention relates to a watch or a smart watch comprising a low energy display for a watch or a smart watch, preferably of a watch or a smart watch, configured to display at least one piece of information and to receive at least one primary light according to an embodiment of the present invention.

Thanks to this configuration, said watch has a low power consuming and a bright and enhanced low energy display.

BRIEF DESCRIPTION OF THE DRAWINGS

The foregoing and other purposes, features, aspects and advantages of the invention will become apparent from the following detailed description of the embodiments, given by way of illustration and not limitation with reference to the accompanying drawings, in which.

DESCRIPTION OF THE INVENTION

Figure 1A:
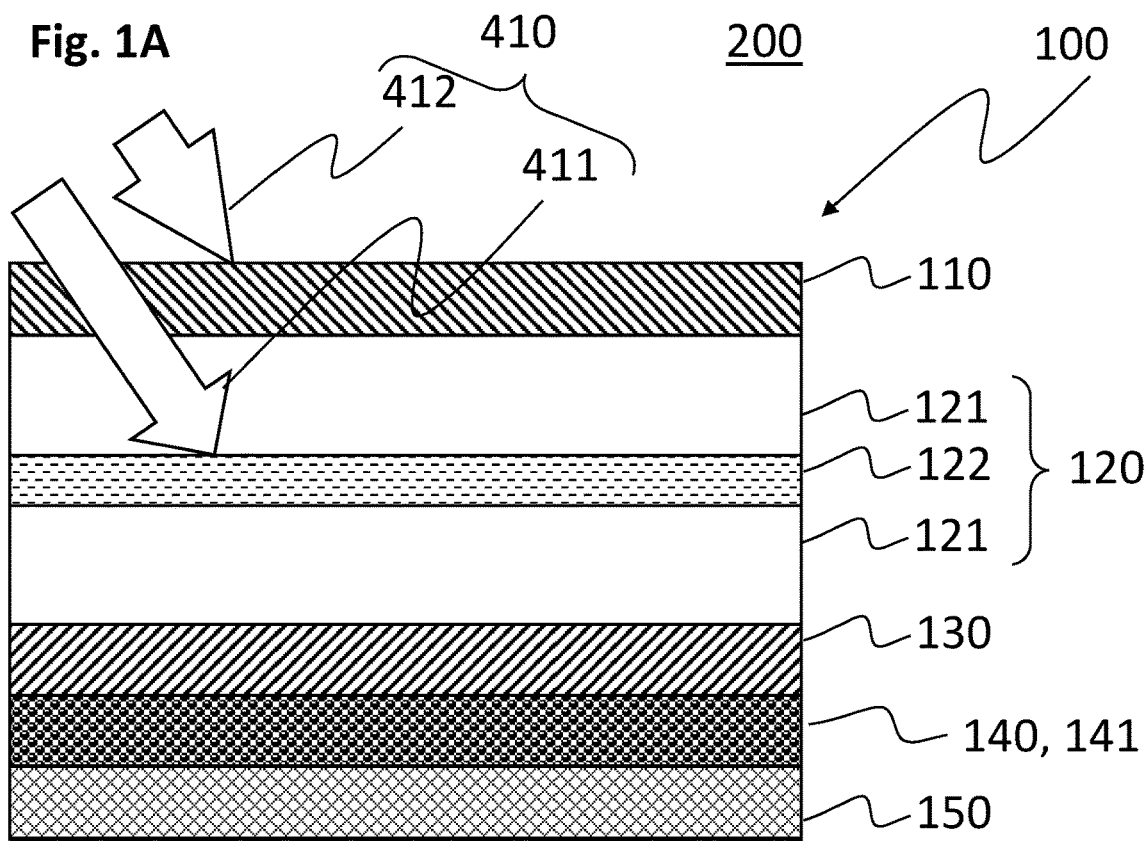
FIGS. 1A and 1B represent a cross-sectional view of a low energy display 100 comprising at least one quantum dot 141 according to an embodiments of the invention; and, FIGS. 2A and 2B represent illustrate a cross-sectional view of a low energy display 100 comprising of at least one quantum rod 142 according to an embodiments of the invention.

Currently, the LCD, although they are widely used in watches and smart watches, lacks esthetics quality and are often too dark. Therefore, the applicant proposes a low energy display 100 for a watch 200 or a smart watch 200, preferably of a watch 200 or a smart watch 200, as depicted in FIGS. 1A-2B.

The present invention relates to a watch 200 or a smart watch 200 comprising a low energy display 100 for a watch 200 or a smart watch 200, preferably of a watch 200 or a smart watch 200. Said low energy display 100 is configured to display at least one piece of information and is configured to receive at least one primary light 410. As shown in different figures, said low energy display 100 may comprise at least one first optical filter 110, at least one wavelength conversion member 140, at least reflecting element 150 and at least one optical switch 120. In some embodiments, said low energy display 100 may comprises at least one second optical filter 130. Indeed, an addition of said at least one second optical filter 130 may induce efficiency loss in some cases.

As aforementioned, when said watch 200 or said smart watch 200 is enlightened, said low energy display 100 may receive said at least one primary light 410, typically sunlight or artificial light like bulb light, comprising at least one first primary wavelength 411, at least one second primary wavelength 412, at least one first primary polarization 411 and/or at least one second primary polarization 412. For ease of reading, the reference 411 in FIGS. 1A-2B may designate said at least one first primary wavelength 411 and said at least one first primary polarization 411 and the reference 412 may designate said at least one second primary wavelength 412 and said at least one second primary polarization 412.

Figure 2A:
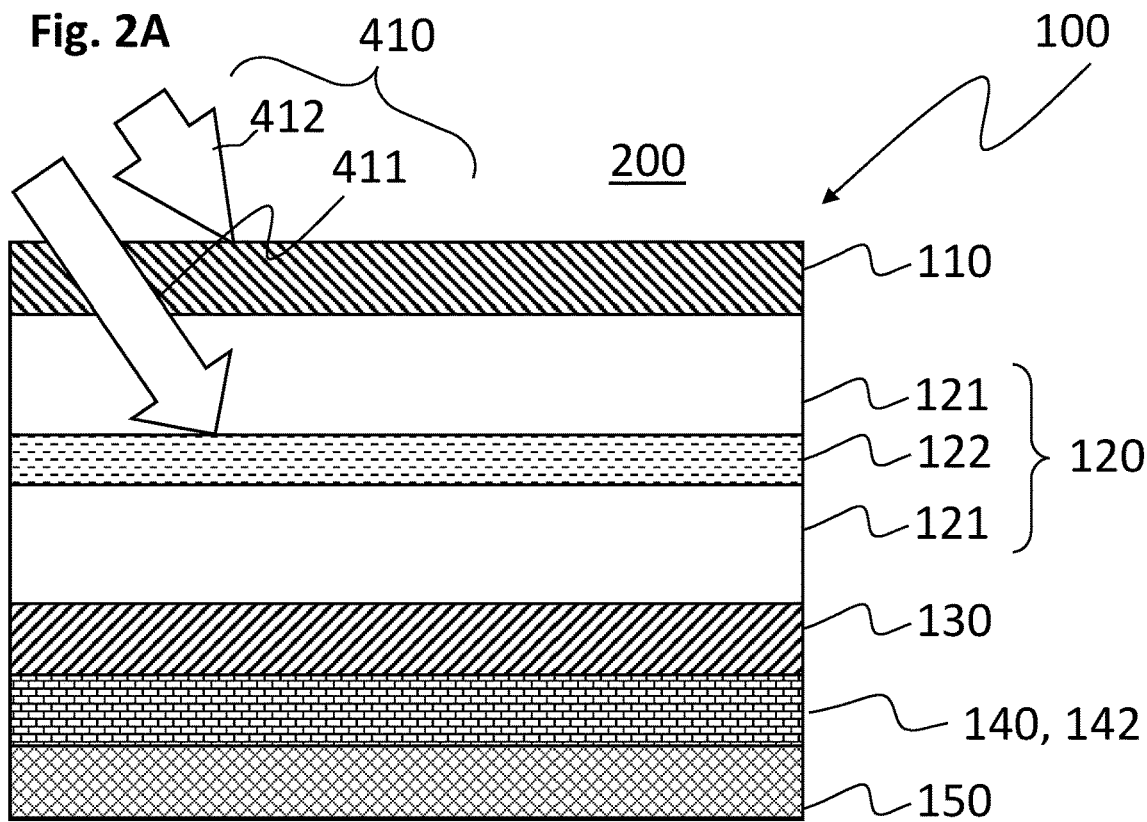

As depicted in FIGS. 1A and 2A for instance, said at least one first optical filter 110 may comprise at least one first polarizer 110 configured to transmit totally or partially said at least one first primary polarization 411 and/or to block totally or partially said at least one second primary polarization 412. Indeed, said at least one first primary polarization 411 and said at least one second primary polarization 412 may be different with a polarization angle of $\pi/2$.

In case where said at least one first optical filter 110 may comprise at least one first color filter 110, said at least one first primary wavelength 411 may be transmitted, rather may go through said at least one first optical filter 110, and said at least one second primary wavelength 412 may not go through said at least one first optical filter 110. Indeed, said at least one primary light 410 may comprise at least one primary wavelength range of 380 nm to 565 nm, and said at least one first optical filter 110 may transmit primary wavelength range of 380 nm to 565 nm and may block wavelength which are not comprised in wavelength range of 380 nm to 565 nm. In other words, said at least one first primary wavelength 411 may be comprised in primary wavelength range of 380 nm to 565 nm and said at least one second primary wavelength 412 not.

As mentioned above, said at least one primary light 410, more precisely said at least one first primary wavelength 411 and said at least one first primary polarization 411 may go said at least one first optical filter 110 and may meet said at least one optical switch 120. The latter, e.g. said at least one display optical switch 120 may block or transmit totally or partially said at least one primary light 410.

Indeed, said at least one optical switch 120 may comprise a liquid-crystal display 120, or thin-film transistor liquid-crystal display 120, using either of the known liquid crystal mode, which may be Ghest-Host Liquid Crystal display, Twisted Nematic or Super Twisted Nematic, Electronically Controlled Birefringence, Vertically Aligned, In Plane Switching and/or Fringe Field Switching. In some embodiment not represented, said at least one optical switch 120 may comprise Ghest-Host Liquid Crystal display, which may mean that said at least one optical switch 120 may comprise dichroic dies, which may be said at least one first optical filter 110 and/or said at least one second optical filter 130. In this case, said at least one second optical filter 130 and/or said at least one first optical filter 110 may be optional.

Figure 1B:
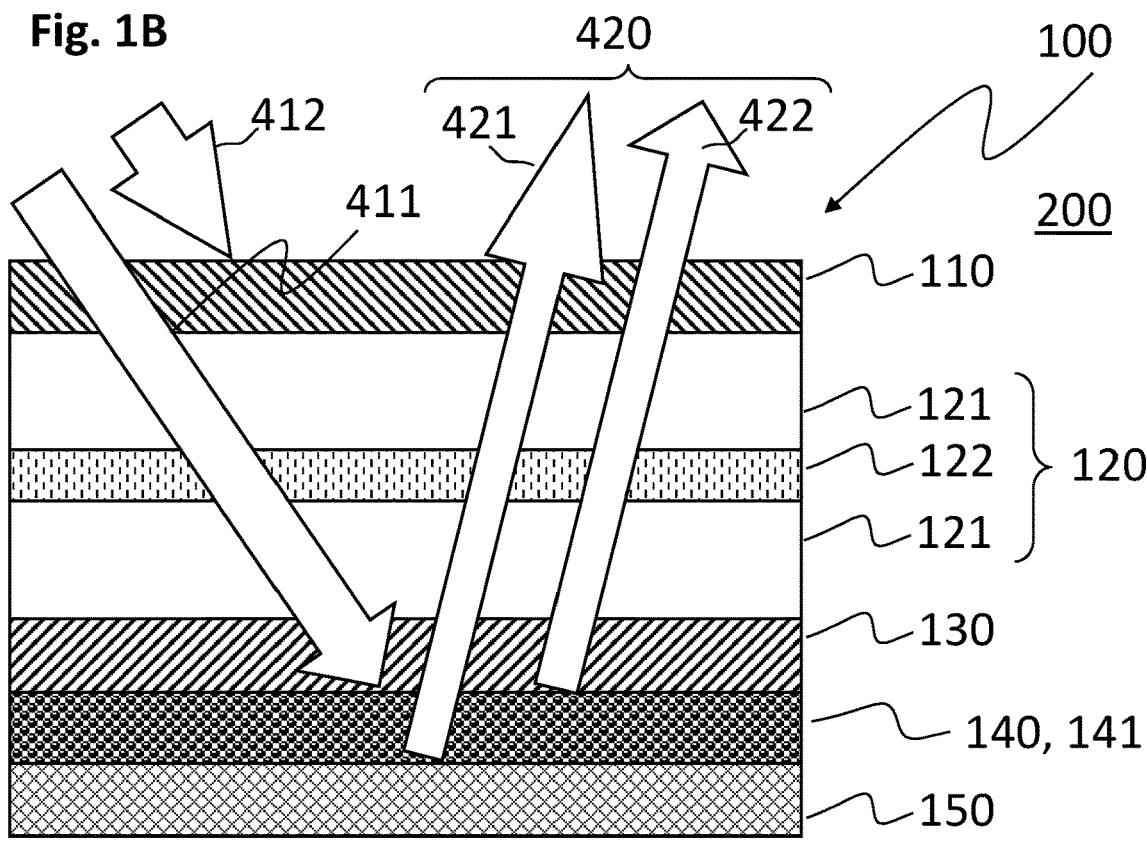
Figure 2B:
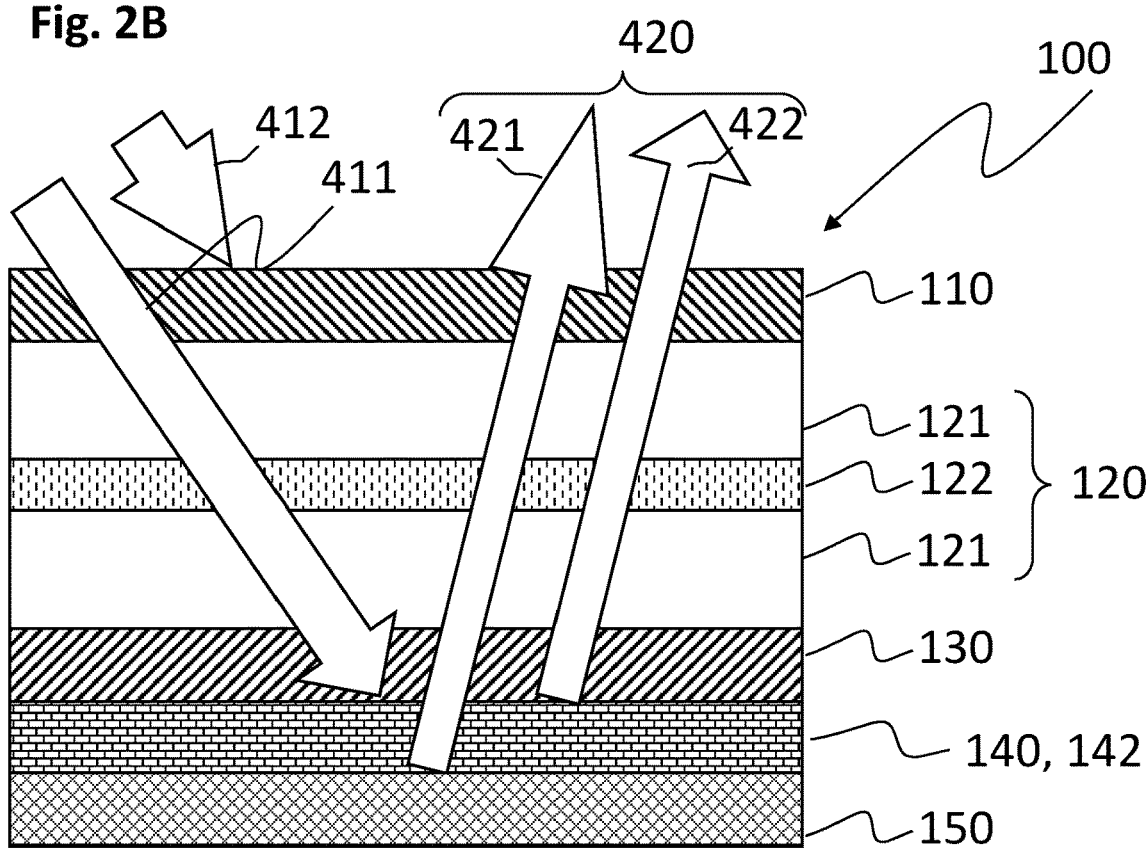

The difference between FIGS. 1A and 1B or FIGS. 2A and 2B is the orientation of the liquid-crystal 122 in said at least one optical switch 120 between at least two electrodes 121 for example: in FIGS. 1A and 2A, the liquid-crystal may block said at least one first primary wavelength 411 and/or said at least one first primary polarization 411 and in FIGS. 1B and 2B, the liquid-crystal may transmit said at least one first primary wavelength 411 and/or said at least one first primary polarization 411.

So, after meeting said at least one display optical switch 120, said at least one primary light 410 may go further and meet said at least one second optical filter 130. Said at least one second optical filter 130 may be optional and may transmit totally or partially said at least one first primary polarization 411 towards said at least one wavelength conversion member 140, if said at least one second optical filter 130 is at least one second polarizer 130. In case where said at least one second optical filter 130 may comprise at least one second color filter 130, said at least one first primary wavelength 411 is transmitted towards said at least one wavelength conversion member 140.

As aforementioned, said at least one wavelength conversion member 140 may convert totally or partially said at least one primary light 410. This conversion may occur by absorbing totally or partially said at least one first primary wavelength 411 and by emitting said at least one secondary light 420 comprising at least one first secondary wavelength 421, at least one second secondary wavelength 422, at least one first secondary polarization 421 and at least one second secondary polarization 422.

Indeed, said at least one wavelength conversion member 140 is configured to convert totally or partially said at least one primary light 410, having said at least one primary wavelength range of 380 nm to 565 nm, into at least one secondary light 420 having at least one secondary wavelength range of 485 nm to 740 nm.

As illustrated in FIGS. 1A and 1B, said at least one wavelength conversion member 140 is made of at least one quantum dot 141. In another embodiment depicted in FIGS. 2A and 2B, said at least one wavelength conversion member 140 is made of at least one quantum rod 142. Of course, the applicant does not exclude that said at least one wavelength conversion member 140 may comprise said at least one quantum dot 141 and said at least one quantum rod 142. In all different embodiments, said quantum dot 141 and/or quantum rod 142 converts said at least one primary light 410 into at least one secondary light 420. However, an advantage of said at least one quantum rod 142 is that said at least one quantum rod 142 may be aligned relative to the polarization sensitive optical switch 120, so the transmittance of said at least one secondary light 420 emitted by said at least one quantum rod 142 is maximized. The applicant does not exclude to replace said at least one quantum dot 141, and/or of at least one quantum rod 142 by a phosphorescent material or a fluorescent material.

As illustrated in FIGS. 1B and 2B, a portion of said at least one secondary light 420, in particular said at least one first secondary wavelength 421 and/or said at least one first secondary polarization 421 may be emitted towards said at least reflecting element 150.

Said at least reflecting element 150 may comprise a reflector 150, preferably a metallic reflector and/or a dielectric reflector or a reflective polarizer preferably a multi-interference-layers and/or a wiregrid type, such as said low energy display 100 may reflect and/or diffuse, according the surface of said at least reflecting element 150, said at least one primary light 410 and/or said at least one secondary light 420.

The other portion of said at least one secondary light 420, in particular said at least one second secondary wavelength 422 and said at least one second secondary polarization 422 may be directly emitted towards and through said at least one second optical filter 130 and/or said at least one first optical filter 110. At the end, said at least one first secondary wavelength 421, said at least one first secondary polarization 421 said at least one second secondary wavelength 422 and said at least one second secondary polarization 422 may be directed towards said at least one first optical filter 110 and outside of said watch 200 or said smart watch 200 towards the user for example.

The invention claimed is:

1. A low energy display (100) for a watch (200) configured to display at least one piece of information and to receive a primary light (410) that includes a first primary wavelength (411) and a second primary wavelength (412); the low energy display (100) comprising:
    a wavelength conversion member (140) configured to convert totally or partially the primary light (410), by absorbing totally or partially the primary light (410), into a secondary light (420) that includes a first secondary wavelength (421) and a second secondary wavelength (422), by emitting the secondary light (420);
    an optical switch (120) above the wavelength conversion member (140), and configured to block or transmit totally or partially the primary light (410) or the secondary light (420);
    a reflecting element (150) below the wavelength conversion member (140), and configured to reflect or to diffuse totally or partially the secondary light (420) and the primary light (410);
    a first color filter (110) above the optical switch (120), and configured to transmit the first primary wavelength (411), the first secondary wavelength (421), the second secondary wavelength (422), and to block the second primary wavelength (412); and
    a second color filter (130) below the optical switch (120) and above the reflecting element (150), and configured to transmit totally or partially the first primary wavelength (411), the first secondary wavelength (421), and the second secondary wavelength (422),
    wherein the second color filter (130) is below the optical switch (120) and above the wavelength conversion member (140).

2. The low energy display (100) according to claim 1, wherein the wavelength conversion member (140) comprises a quantum dot (141), a phosphorescent material, a fluorescent material, or a quantum rod (142).

3. The low energy display (100) according to claim 2, wherein the wavelength conversion member (140) comprises the quantum rod (142).

4. The low energy display (100) according to claim 1, wherein the optical switch (120) comprises a liquid-crystal display (120) or a thin-film transistor liquid-crystal display (120).

5. The low energy display (100) according to claim 1, wherein the reflecting element (150) comprises a reflector (150).

6. The low energy display (100) according to claim 1, wherein the optical switch (120) comprises dichroic dyes that are configured as at least one optical filter.

7. The low energy display (100) according to claim 1, wherein the primary light (410) comprises a primary wavelength range of 380 nm to 565 nm and the secondary light (420) comprises a secondary wavelength range of 485 nm to 740 nm.

8. A watch (200) comprising the low energy display (100) according to claim 1, wherein the watch (200) is configured to display the at least one piece of information and to receive the primary light (410).

* * * * *